Nov. 23, 1937.　　　L. F. WILSON ET AL　　　2,100,095
LOCOMOTIVE STEAM SEPARATOR
Filed July 1, 1936
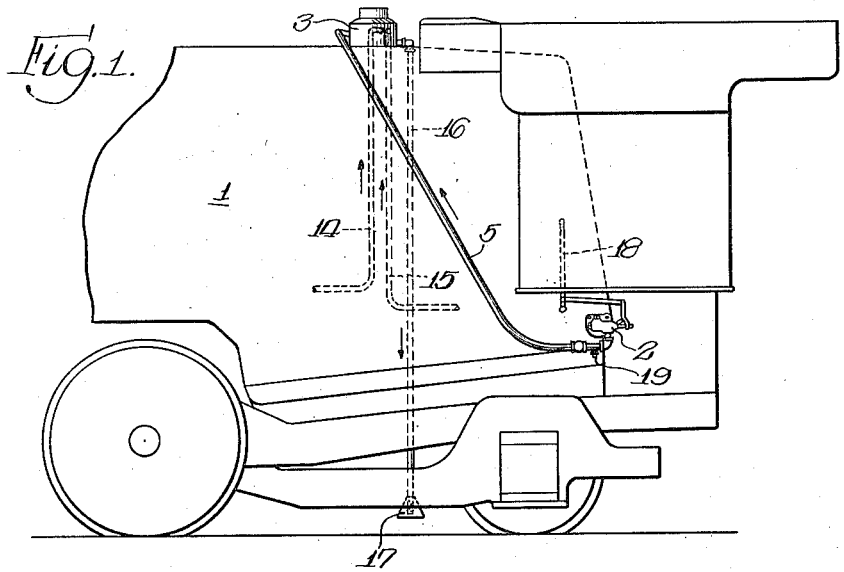
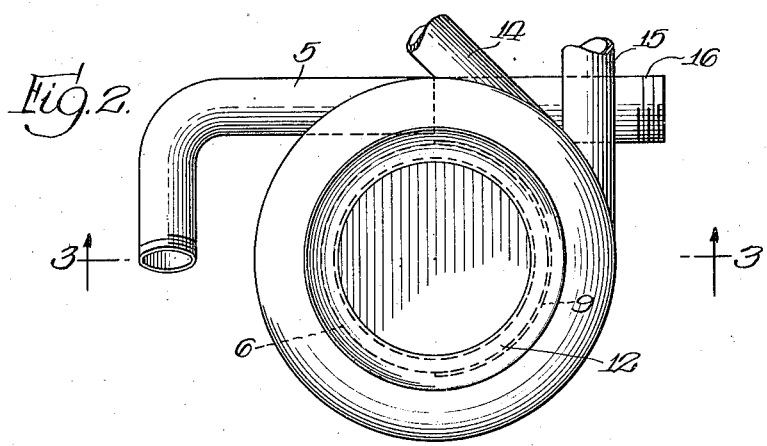
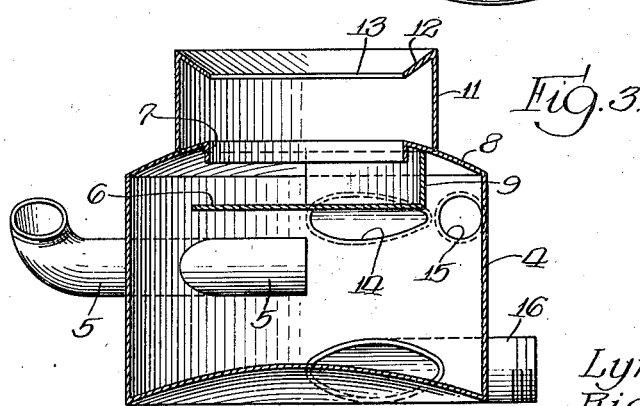
Inventors:-
Lyndon F. Wilson,
Richard J. Williams,
By Wilson, Dovell, McCanna & Foley Attys.

Patented Nov. 23, 1937

2,100,095

UNITED STATES PATENT OFFICE 2,100,095

LOCOMOTIVE STEAM SEPARATOR

Lyndon F. Wilson, Chicago, Ill., and Richard J. Williams, Detroit, Mich., assignors to Wilson Engineering Corporation, Chicago, Ill., a corporation of Delaware Application July 1, 1936, Serial No. 88,330

2 Claims. (Cl. 122—382)

This invention pertains to steam separating apparatus for use particularly on locomotives and is employed for separating steam from blow-off water and to separate condensate from exhaust steam delivered from the auxiliaries on the locomotive.

In the prior Patent No. 1,966,776, issued July 17, 1934, to L. F. Wilson, separator apparatus for the blow-off is shown. In the present invention the exhaust steam from such auxiliary devices as the automatic stoker, the boiler feed pump, the air pump, and the turbo-generator is delivered into the apparatus which separates the steam from the blow-off water.

It is an object of this invention to provide a separating apparatus so constructed and arranged as to separate efficiently either steam from blow-off water or condensate from exhaust steam separately or simultaneously.

It is another object of the invention to accomplish in a separating apparatus the separation of the two above-mentioned waste products, that is, blow-off water or exhaust steam, simultaneously without creating a back pressure upon the exhaust steam lines leading to the apparatus so that no interference with the operation of the auxiliary steam driven appliances will occur when blow-off water is being separated in the apparatus.

Another object of the invention is to provide new and improved means for discharging exhaust steam from the auxiliaries on a locomotive in such a manner that the discharge steam will be least likely to interfere with the safe operation of the locomotive, while at the same time separately discharging all or substantially all of the condensate originally carried by or derived from the exhaust steam.

Other objects and advantages of the invention will become apparent from a perusal of the following specification.

In the drawing:

Fig. 1 is a side elevation showing one form of the apparatus in which this invention is embodied;

Fig. 2 is a top plan view of the separator and the connections thereto employed in the apparatus shown in Fig. 1; and Fig. 3 is a vertical sectional view on the line 3—3 of the apparatus shown in Fig. 2.

Referring further to the drawing and the first embodiment of the invention, a locomotive generally indicated as 1 having a blow-off cock 2 is provided with a separator 3 which may be constructed as shown in Figs. 2 and 3.

This separator consists of a hollow cylindrical shell 4 into which protrudes a pipe 5 which is connected with the discharge outlet of the blow-off cock. This blow-off pipe extends, as shown, into the interior of the separator underneath a baffle 6 which preferably is a circular disc disposed beneath the circular port 7 and connected to the top wall 8 of the separator chamber by means of a vertical arcuate baffle 9 which extends around and below the port 7, 180°, terminating substantially at a vertical plane which intersects the axis of the separator at the open end of the pipe 5.

The baffle construction just described is preferably that which is shown in the above-mentioned Wilson Patent No. 1,966,776.

Disposed above and surrounding the port 7 is a collar 11 having an inwardly inclined flange 12 defining a central port 13 through which the separated steam may escape to the atmosphere.

Also connected with the separator chamber and preferably in substantially the relationship shown is a plurality of exhaust steam pipes, each leading from one or more of the auxiliary devices on the locomotive which employ steam for their propulsion, such as the turbo-generator for the headlight, the boiler feed pump, the stoker, the air pump and other steam using devices with which the locomotive may be equipped.

For the sake of illustrating the invention, the pipe 14 may be considered as the pipe delivering exhaust steam from the boiler feed pump while the pipe 15 may be regarded as delivering exhaust steam from the stoker. Whenever it is practical to do so, two or more exhaust steam pipes may be combined to deliver into this separator. Each producer of exhaust steam may have its own individual pipe delivering into the separator. However, it is important that delivery into the separator should be so arranged that when blow-off water is being discharged into the separator through the pipe 5 the centrifugal action of the inflowing water and steam will not set up a counter pressure or back pressure in the exhaust steam pipes but rather will create a slight suction in the exhaust steam pipes or at least not create enough back pressure to have any appreciable interference with the operation of the auxiliaries from which the exhaust steam is being delivered. The arrangement herein shown is so constructed that no back pressure in the exhaust steam pipes will be created.

A pipe 16 extending tangentially from the lower part of the separating chamber is employed to carry off the water from which the blow-off steam has been separated and the condensate which is separated from the exhaust steam. This pipe preferably will extend around the barrel of the boiler down close to the track and discharge to the ground through a baffling device 17 such as is shown on the end of the water discharge pipe in the above-mentioned Wilson patent.

In the operation of the embodiment of the invention shown in Figs. 1 to 3, inclusive, the blow-off may be accomplished whenever and as frequently as may be desired by opening the valve 2 by means of a lever mechanism generally indicated as 18, or by some other valve operating means. The blow-off water will ascend through the pipe 5 and will be delivered tangentially into the separator 3. As the water flows centrifugally around the interior of the separator, the steam will be released therefrom and will escape around the open side of the baffle plate 6 and upwardly to the atmosphere so that the escaping steam will make very little noise. Because of the release of pressure, the blow-off water remaining will drain through the pipe 16 and be delivered in a widely diverged stream upon the track with insufficient force to cause any damage to the track ballast.

The auxiliary devices are more or less constantly delivering exhaust steam through the various pipes into the separator. The exhaust steam so delivered, when the blow-off valve is not open, will also acquire a centrifugal motion in the separator; and the condensate will be thrown against the outer wall 4 of the cylinder and will then drain through the pipe 16 while the steam escapes noiselessly through the port 13 to the atmosphere. When the blow-off valve is open, the high velocity of the centrifugal motion of the blow-off products within the separating chamber will exert a slight suction upon the exhaust steam pipes which empty into the separator and the exhaust steam will accompany the blow-off steam in its escape to atmosphere while the condensate accompanying the exhaust steam will drain through pipe 16.

It should be understood that, while a mechanically operated blow-off valve is shown in Fig. 1, pneumatically operated valves may also be employed; and the discharge may be either continuous or intermittent, as all of the advantages of the invention are retained under either mode of operation.

Preferably there will be disposed in the pipe 5 an automatic drain valve 19 which will open when the blow-off is not occurring to drain water from the pipe line 5 and thus prevent it from freezing during cold weather.

Heretofore various means of disposal of the exhaust steam from the auxiliary devices have been employed but not with entire suction. As is well known, exhaust steam has been discharged through the stack. In such instances the condensate is thrown out with the steam and becomes mixed with soot which is often blown back upon the locomotive crew or upon the train equipment.

However, in accordance with the present invention, the exhaust steam is delivered free from condensate directly to the atmosphere higher than the engine cab and close enough to it so that it will not ordinarily be blown into the cab, and being entirely clean and free from condensate it will do little or no harm should a perverse wind temporarily deflect it into the cab or against the windows thereof.

It should be understood that the modification of the invention herein has been selected for the purpose of illustrating the nature of the invention but is not to be considered to indicate the full scope of the invention as other modifications may be devised which will, nevertheless, remain within the spirit and scope of the invention as defined in the following claims.

Having shown and described our invention, we claim:

1. A separator for separating the steam and water discharged by the blow-off valve and by the steam operated auxiliaries of a locomotive comprising a cylindrical shell adapted to be mounted in vertical position upon a locomotive and provided with an internal, horizontally disposed baffle and an upwardly extending steam delivery throat, a pipe connected tangentially to said shell through which steam and water from the blow-off valve are delivered tangentially into said separator, an auxiliary exhaust pipe connected tangentially to said shell in such proximity to the path of the blow-off products delivered by said first pipe that a suction is produced in said auxiliary exhaust pipe by the discharge of said products, and a discharge pipe connected tangentially to the lower portion of said shell through which the separated water is discharged from the shell, the separated steam being discharged from said shell upwardly through said throat.

2. The combination of a locomotive provided with a blow-off valve and with one or more steam operated auxiliaries, of a separator comprising a cylindrical shell mounted in vertical position upon the locomotive and provided with an internal, horizontally disposed baffle and an upwardly extending steam delivery throat, a pipe leading from the blow-off valve and connected to said shell so as to deliver blow-off steam and water tangentially into the shell, an exhaust steam pipe leading from said auxiliaries and connected to said shell to deliver exhaust steam tangentially thereto, said exhaust steam pipe being so connected to the shell in proximity to the path of the blow-off products delivered by said blow-off valve to the shell that said blow-off products prevent the production of a back pressure in said exhaust steam pipe, and a discharge pipe connected with the lower portion of said shell through which the liquid separated in said shell from the steam is discharged tangentially from said shell.

LYNDON F. WILSON.
RICHARD J. WILLIAMS.